US012044464B2

(12) United States Patent
McMillin et al.

(10) Patent No.: US 12,044,464 B2
(45) Date of Patent: *Jul. 23, 2024

(54) ILLUMINATED SHELF ASSEMBLIES

(71) Applicant: SSW Advanced Technologies, LLC, Louisville, KY (US)

(72) Inventors: Matthew McMillin, Palmyra, IN (US); Jason Robert Yochum, Haubstadt, IN (US)

(73) Assignee: SSW Advanced Technologies, LLC, Louisville, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/964,410

(22) Filed: Oct. 12, 2022

(65) Prior Publication Data

US 2023/0122809 A1 Apr. 20, 2023

Related U.S. Application Data

(60) Provisional application No. 63/256,184, filed on Oct. 15, 2021.

(51) Int. Cl.
*F25D 27/00* (2006.01)
*F21V 21/002* (2006.01)
(Continued)

(52) U.S. Cl.
CPC .......... *F25D 27/005* (2013.01); *F21V 21/002* (2013.01); *F21V 23/06* (2013.01);
(Continued)

(58) Field of Classification Search
CPC ........ F25D 27/00; F25D 27/005; F25D 25/02; F25D 2327/00; F25D 2700/02;
(Continued)

(56) References Cited

U.S. PATENT DOCUMENTS 3,506,325 A 4/1970 Horvay
4,973,796 A 11/1990 Dougherty et al.
(Continued)

FOREIGN PATENT DOCUMENTS

CN 1727748 A 2/2006
CN 201377735 Y 1/2010
(Continued)

OTHER PUBLICATIONS

International Application No. PCT/US2022/046376, International Search Report and Written Opinion of the International Searching Authority, mailing date Jan. 20, 2023.

(Continued)

*Primary Examiner* — Andrew Roersma
(74) *Attorney, Agent, or Firm* — MARSHALL, GERSTEIN & BORUN LLP; Michael P. Furmanek

(57) ABSTRACT

A shelf assembly for an enclosure includes a shelf panel and side brackets coupled to the shelf panel along respective lateral portions thereof. Each of the side brackets have a rear coupling portion configured to mount to structure of the enclosure. One or more light sources are mounted and electrically coupled to one of the side brackets and a connection between one or both of the side brackets and the structure of the enclosure is configured to provide power to illuminate the one or more light sources.

15 Claims, 10 Drawing Sheets

(51) Int. Cl.
*F21V 23/06* (2006.01)
*F21Y 103/10* (2016.01)
*F25D 25/02* (2006.01)

(52) U.S. Cl.
CPC .......... *F25D 25/02* (2013.01); *F21Y 2103/10* (2016.08); *F25D 2700/02* (2013.01); *F25D 2700/04* (2013.01)

(58) Field of Classification Search
CPC ......... F25D 2700/04; A47B 2220/0077; F21V 21/002; F21V 23/06; F21Y 2103/10
See application file for complete search history.

(56) References Cited

U.S. PATENT DOCUMENTS

| | | | | |
|---|---|---|---|---|
| 5,034,861 | A | 7/1991 | Sklenak et al. | |
| 5,287,252 | A | 2/1994 | Caruso | |
| 5,403,083 | A | 4/1995 | Dasher et al. | |
| 5,425,648 | A | 6/1995 | Farham | |
| 5,429,433 | A | 7/1995 | Bird et al. | |
| 5,454,638 | A | 10/1995 | Bird et al. | |
| 5,564,809 | A | 10/1996 | Kane et al. | |
| 5,690,415 | A | 11/1997 | Krehl | |
| 5,735,589 | A | 4/1998 | Herrmann et al. | |
| 5,745,514 | A | 4/1998 | Patel et al. | |
| 6,042,244 | A | 3/2000 | Witkoski | |
| 6,120,720 | A | 9/2000 | Meier et al. | |
| 6,179,434 | B1 * | 1/2001 | Saraiji | A47F 3/001 362/125 |
| 6,210,013 | B1 | 4/2001 | Bousfield | |
| 6,231,205 | B1 | 5/2001 | Slesinger et al. | |
| 6,340,113 | B1 | 1/2002 | Avery et al. | |
| 6,364,273 | B1 | 4/2002 | Otema | |
| 6,431,721 | B2 | 8/2002 | Shemitz et al. | |
| 6,558,017 | B1 | 5/2003 | Saraiji et al. | |
| 6,578,979 | B2 | 6/2003 | Truttmann-Battig | |
| 6,726,341 | B2 | 4/2004 | Pashley et al. | |
| 6,786,562 | B2 * | 9/2004 | Obrock | F25D 27/00 211/153 |
| 6,813,896 | B1 | 11/2004 | Janke et al. | |
| 6,827,463 | B2 | 12/2004 | Chuang et al. | |
| 7,005,805 | B2 | 2/2006 | Ahn | |
| 7,080,920 | B2 | 7/2006 | Fitzsimmons et al. | |
| 7,107,779 | B2 | 9/2006 | Avenwedde et al. | |
| 7,121,675 | B2 | 10/2006 | Ter-Hovhannisian | |
| 7,163,305 | B2 * | 1/2007 | Bienick | A47F 11/10 362/125 |
| 7,210,808 | B2 | 5/2007 | Malpetti | |
| 7,273,299 | B2 | 9/2007 | Parkyn et al. | |
| 7,338,180 | B2 | 3/2008 | Wing | |
| 7,434,951 | B2 | 10/2008 | Bienick | |
| 7,574,822 | B1 | 8/2009 | Moore | |
| 7,600,887 | B2 | 10/2009 | Sherman | |
| 7,748,806 | B2 | 7/2010 | Egan | |
| 7,766,502 | B2 | 8/2010 | Tress | |
| 7,806,543 | B2 | 10/2010 | Swofford et al. | |
| 7,824,055 | B2 | 11/2010 | Sherman | |
| 7,840,286 | B2 | 11/2010 | Caldwell et al. | |
| 7,976,181 | B2 | 7/2011 | Kelly et al. | |
| 8,135,482 | B2 | 3/2012 | Caldwell et al. | |
| 8,136,956 | B2 | 3/2012 | Oketeni et al. | |
| 8,215,795 | B2 | 7/2012 | Pichel | |
| 8,322,873 | B2 | 12/2012 | Glovatsky et al. | |
| 8,360,802 | B2 | 1/2013 | Allard et al. | |
| 8,453,476 | B2 | 6/2013 | Kendall et al. | |
| 8,459,817 | B2 | 6/2013 | Alberghetti et al. | |
| 8,678,616 | B2 | 3/2014 | Marquardt et al. | |
| 8,944,621 | B2 * | 2/2015 | Driver | A47B 96/028 362/249.05 |
| 8,967,740 | B2 | 3/2015 | Kerner | |
| 8,979,296 | B2 | 3/2015 | Wiemer et al. | |
| 9,098,823 | B2 | 8/2015 | Slesinger et al. | |
| 9,157,678 | B2 | 10/2015 | Kerner | |
| 9,287,021 | B2 | 3/2016 | Hammond et al. | |
| 9,480,346 | B2 | 11/2016 | Houle | |
| 9,595,373 | B2 | 3/2017 | Hammond et al. | |
| 9,766,010 | B2 | 9/2017 | Katu et al. | |
| 9,989,298 | B1 * | 6/2018 | Wantland | A47B 96/061 |
| 10,340,741 | B2 * | 7/2019 | Lee | F25D 25/02 |
| 11,779,132 | B2 * | 10/2023 | McMillin | F25D 27/005 362/125 |
| 2003/0038571 | A1 | 2/2003 | Obrock et al. | |
| 2003/0137828 | A1 | 7/2003 | Ter-Hovhannisian | |
| 2004/0212990 | A1 | 10/2004 | Becker | |
| 2004/0264160 | A1 | 12/2004 | Bienick | |
| 2005/0093408 | A1 | 5/2005 | Koloff et al. | |
| 2006/0029808 | A1 | 2/2006 | Zhai et al. | |
| 2006/0137378 | A1 * | 6/2006 | Choi | F25D 27/005 62/157 |
| 2006/0216476 | A1 | 9/2006 | Ganti et al. | |
| 2007/0058369 | A1 | 3/2007 | Parkyn et al. | |
| 2007/0075199 | A1 | 4/2007 | Stewart et al. | |
| 2007/0104841 | A1 | 5/2007 | Min et al. | |
| 2007/0109764 | A1 | 5/2007 | Bienick | |
| 2007/0127229 | A1 | 6/2007 | Lee et al. | |
| 2007/0144196 | A1 | 6/2007 | Currie | |
| 2007/0151274 | A1 | 7/2007 | Roche et al. | |
| 2007/0180843 | A1 | 8/2007 | Park et al. | |
| 2007/0266723 | A1 | 11/2007 | Lee et al. | |
| 2008/0007945 | A1 | 1/2008 | Kelly et al. | |
| 2008/0037239 | A1 | 2/2008 | Thomas et al. | |
| 2008/0043456 | A1 * | 2/2008 | Bernardini | F25D 25/02 362/125 |
| 2008/0092782 | A1 | 4/2008 | Daniel | |
| 2008/0121146 | A1 | 5/2008 | Burns et al. | |
| 2008/0158858 | A1 | 7/2008 | Madireddi et al. | |
| 2008/0186695 | A1 | 8/2008 | Awai et al. | |
| 2008/0186696 | A1 | 8/2008 | Awai et al. | |
| 2008/0205044 | A1 | 8/2008 | Shibusawa et al. | |
| 2008/0278932 | A1 | 11/2008 | Tress | |
| 2009/0002990 | A1 | 1/2009 | Becker et al. | |
| 2009/0021927 | A1 | 1/2009 | Hall et al. | |
| 2009/0091271 | A1 | 4/2009 | Zulim et al. | |
| 2009/0250715 | A1 | 10/2009 | Lee et al. | |
| 2010/0006519 | A1 | 1/2010 | Van De Steen | |
| 2010/0097780 | A1 | 4/2010 | Beatenbough et al. | |
| 2010/0135020 | A1 | 6/2010 | Moore | |
| 2010/0195317 | A1 | 8/2010 | Oketani | |
| 2010/0259148 | A1 | 10/2010 | Alberghetti et al. | |
| 2011/0051401 | A1 | 3/2011 | Bauer et al. | |
| 2011/0096533 | A1 | 4/2011 | Sekela | |
| 2011/0164399 | A1 | 7/2011 | Driver et al. | |
| 2011/0203302 | A1 | 8/2011 | Alberghetti et al. | |
| 2011/0204009 | A1 | 8/2011 | Karan | |
| 2011/0273867 | A1 | 11/2011 | Horst et al. | |
| 2012/0106129 | A1 | 5/2012 | Glovatsky et al. | |
| 2012/0230018 | A1 | 9/2012 | Wiemer et al. | |
| 2013/0122739 | A1 | 5/2013 | Allard et al. | |
| 2013/0188356 | A1 | 7/2013 | Breslow et al. | |
| 2013/0286651 | A1 | 10/2013 | Takeuchi | |
| 2014/0060095 | A1 | 3/2014 | Shur et al. | |
| 2014/0111118 | A1 * | 4/2014 | Kendall | F25D 23/028 315/362 |
| 2014/0140040 | A1 * | 5/2014 | Giacomini | F25D 27/00 362/92 |
| 2014/0349502 | A1 * | 11/2014 | Meis | H05K 1/118 439/212 |
| 2014/0376213 | A1 | 12/2014 | Miedema et al. | |
| 2015/0023000 | A1 | 1/2015 | Kendall et al. | |
| 2015/0308653 | A1 | 10/2015 | Wang et al. | |
| 2016/0097516 | A1 | 4/2016 | Howard | |
| 2016/0341470 | A1 * | 11/2016 | Brown | F25D 25/02 |
| 2016/0356544 | A1 * | 12/2016 | Kerner | F25D 25/02 |
| 2017/0074581 | A1 * | 3/2017 | Kerner | F21V 23/06 |
| 2017/0100495 | A1 | 4/2017 | Shur et al. | |
| 2017/0191743 | A1 * | 7/2017 | Lee | F25D 25/02 |
| 2017/0368215 | A1 | 12/2017 | Shatalov et al. | |
| 2018/0221521 | A1 | 8/2018 | Shur et al. | |
| 2018/0243458 | A1 | 8/2018 | Shatalov et al. | |

(56) References Cited

U.S. PATENT DOCUMENTS

| | | | | |
|---|---|---|---|---|
| 2018/0306971 | A1 | 10/2018 | Conrad | |
| 2023/0122053 | A1* | 4/2023 | McMillin | H02J 50/005 307/80 |

FOREIGN PATENT DOCUMENTS

| | | | | | |
|---|---|---|---|---|---|
| CN | 101791180 | A | | 8/2010 | |
| CN | 201875445 | U | | 6/2011 | |
| CN | 201977332 | U | | 9/2011 | |
| CN | 201999332 | U | | 10/2011 | |
| CN | 102656404 | A | | 9/2012 | |
| CN | 202504813 | U | | 10/2012 | |
| CN | 102980089 | A | | 3/2013 | |
| CN | 202886235 | U | | 4/2013 | |
| CN | 103104892 | A | | 5/2013 | |
| CN | 107192213 | A | | 9/2017 | |
| DE | 202009010551 | U1 | | 12/2009 | |
| DE | 202010005347 | U1 | | 8/2010 | |
| DE | 102009002503 | A1 | | 10/2010 | |
| DE | 202009018504 | U1 | | 12/2011 | |
| DE | 102015007839 | A1 | | 12/2016 | |
| EP | 1174661 | A1 | | 1/2002 | |
| EP | 1222885 | A1 | | 7/2002 | |
| EP | 1503159 | A2 | | 2/2005 | |
| EP | 1887299 | A2 | | 2/2008 | |
| EP | 1961340 | A1 | | 8/2008 | |
| EP | 2161496 | A1 | | 3/2010 | |
| EP | 3558305 | A1 | | 10/2019 | |
| JP | 2002313133 | A | | 10/2002 | |
| JP | 2004081521 | A | | 3/2004 | |
| JP | 2004344507 | A | | 12/2004 | |
| JP | 2010170970 | A | | 8/2010 | |
| JP | 2010182520 | A | | 8/2010 | |
| JP | 2010264226 | A | | 11/2010 | |
| JP | 2012040334 | A | | 3/2012 | |
| KR | 200343464 | Y1 | | 3/2004 | |
| KR | 787552 | B1 | | 12/2007 | |
| KR | 20110034271 | A | | 4/2011 | |
| KR | 1020190137480 | A | * | 12/2019 | F25D 27/00 |
| KR | 1020200068411 | A | * | 6/2020 | F25D 27/00 |
| WO | WO-2007020470 | A1 | | 2/2007 | |
| WO | WO-2013034497 | A1 | | 3/2013 | |

OTHER PUBLICATIONS

Chinese Patent Application No. 202010870105.8, First Office Action, dated Mar. 29, 2022.

International Search Report dated Oct. 31, 2014 for PCT application No. PCT/US2014/43418, 3 pages.

Written Opinion dated Oct. 31, 2014 for PCT application No. PCT/US2014/43418, 6 pages.

International Preliminary Report on Patentability dated Dec. 22, 2015 for corresponding International Patent Application No. PCT/US2014/43418, 7 pages.

International Application No. PCT/US2022/046373, International Search Report and Written Opinion, mailed Feb. 16, 2023.

International Application No. PCT/US2022/046381, International Search Report and Written Opinion, mailed Jan. 20, 2023.

* cited by examiner

ILLUMINATED SHELF ASSEMBLIES

CROSS-REFERENCE TO RELATED APPLICATION

Priority is claimed to U.S. Provisional Patent Application No. 63/256,184, filed Oct. 15, 2021, the entire contents of which are hereby incorporated by reference herein.

FIELD OF THE DISCLOSURE

The present disclosure is related to shelves and, more particularly, appliance shelves, such as refrigerator shelves.

BACKGROUND

Enclosures and appliances contain shelves and similar storage devices within the appliance interior to organize and support stored goods such as food and containers. These shelves and similar storage devices can be made from a variety of materials including glass, plastic, wood and metals, such as wire and sheet steel. In refrigerators, for example, some known shelving solutions include a glass shelf panel resting on a pair of cantilever side brackets that engage into corresponding features at the back of the refrigerator cavity.

Some shelving solutions incorporate light sources at the front or rear of a shelf panel. Unfortunately, these light sources can be bulky, thereby restricting access to the shelves, and can direct light directly at a user. Additionally, light provided from a single direction can create undesirable shadows on the shelf.

Further, current illuminated shelving utilizing a power source of the enclosure relies on electrical connections with the enclosure from both of the pair of side brackets, which requires an electrical connection to span the shelf panel to electrically connect the side brackets to form a completed circuit.

SUMMARY

In accordance with a first example, a shelf assembly for an enclosure is provided that includes a shelf panel having an upper surface, a lower surface, and an edge extending between the upper and lower surfaces, the upper surface being capable of supporting articles thereon; and side brackets coupled to the shelf panel along respective lateral portions thereof, where each of the side brackets have a rear coupling portion configured to mount to structure of the enclosure. The shelf assembly further includes one or more light sources mounted and electrically coupled to one of the side brackets and a connection between one or both of the side brackets and the structure of the enclosure is configured to provide power to illuminate the one or more light sources.

In some examples, the shelf assembly can include a light housing coupled and electrically connected to the one of the side brackets, where the one or more light sources are received within the housing. In further examples, the light housing can have a watertight, sealed configuration; the housing can include a diffuser disposed within a path of illumination of the one or more light sources; the light housing can be coupled to an interior face of the one of the side brackets; the light housing can be coupled to a bottom edge of the one of the side brackets; and/or the light housing can be coupled to the connection portion of the one of side brackets and extends generally forwardly and inwardly therefrom.

In some examples, the one of the side brackets can define an opening therein with a contact adjacent thereto, and the light housing can have a contact exposed along an exterior thereof, where the contact of the light housing is configured to electrically engage the contact of the side bracket when the light housing is mounted within the opening. In further examples, the housing can be configured to snap-fit within the opening defined in the one of the side brackets; and/or the contact of the side bracket can include one of: an exposed edge, a bare face portion, a conductive adhesive, a conductive pad, or a trace.

In any of the above examples, the one or more light sources can include at least one light oriented downward relative to a horizontal plane of the shelf panel in a range of 5 degrees to 90 degrees; the one or more light sources can include at least one light oriented generally parallel to a horizontal plane of the shelf panel; the one or more light sources can be an array of spaced light emitting diodes; the side brackets can include one configured to be a negative electrode and another configured to be a positive electrode and the shelf assembly can include an electrical cross-over extending between the side brackets across the shelf panel to create a circuit with the enclosure to power the one or more light sources, where the shelf assembly can optionally include a trim strip covering the electrical cross-over; and/or the connection portion of the one of the side brackets can include a negative contact configured to electrically engage a negative supply of the enclosure and a positive contact configured to electrically engage a positive supply of the enclosure.

Any of the above examples can be provided in combination with an enclosure, where the enclosure includes a body defining a compartment having a rear wall, mounting structures extending upwardly along the rear wall, where each of the mounting structures are configured to have one of the side brackets secured thereto to mount the shelf assembly within the enclosure, a door configured to be pivoted between an open position exposing the compartment and a closed position covering the compartment, and a controller configured to selectively provide power to the one or more light sources through a circuit including at least one of the ladders and the one of the side brackets. In further examples, the combination can include a sensor configured to provide data to the controller indicating whether the door is in the open position or the closed position and the controller can be configured to energize the one or more light sources in response to determining that the door is in the open position; the controller can be configured to de-energize the one or more light sources in response to determining that a predetermined amount of time has passed; and/or the combination can include a sensor configured to provide data to the controller indicative of an individual being in front of the shelf assembly and the controller can be configured to energize the one or more light sources in response to receiving the data.

In accordance with a second example, a shelving power supply system for an enclosure is provided that includes mounting structure of the enclosure including a positive terminal member and a negative terminal member and a shelf assembly comprising a side bracket for a shelf assembly including a coupling portion configured to engage the mounting structure to thereby mount the side bracket to the enclosure. The side bracket includes a first contact configured to electrically engage the positive terminal member of the mounting structure when the side bracket is mounted thereto and a second contact configured to electrically engage the negative terminal member of the mounting structure when the side bracket is mounted thereto. The shelving power supply system further includes an electrical component coupled to the shelf assembly and electrically connected to the first contact and the second contact to receive power from the enclosure through the mounting structure.

In some examples, the electrical component can be a light source and/or the electrical component can be coupled to the side bracket.

In some examples, the mounting structure can include a housing comprising a ladder rack having vertically spaced openings disposed therealong, and the coupling portion of the side bracket can include an upper hook and lower plug configured to be inserted into the openings of the ladder rack.

In further examples, the mounting structure can include a busbar disposed within an interior of the housing, where the busbar is one of the positive terminal or the negative terminal. In yet further examples, the first contact of the side bracket can include a conductive member coupled to the lower plug of the coupling portion.

In further examples, the mounting structure can include a second busbar disposed within the interior of the housing, where the second busbar is the other of the positive terminal or the negative terminal and, optionally, the first and second contacts of the side bracket can be spaced first and second conductive members coupled to the lower plug of the coupling portion.

In further examples, the housing can include the other of the positive terminal or the negative terminal. In yet further examples, the housing can be a conductive material and the other of the positive terminal or the negative terminal can be an exposed surface of the housing, the other of the positive terminal or the negative terminal can be a conductive member disposed on the housing. In other examples, the other of the positive terminal or the negative terminal can be a contact disposed adjacent to one of the openings of the ladder rack and the second contact of the side bracket can be a contact disposed on an interior surface of the hook of the coupling portion. In these examples, the side bracket can be a conductive material and the second contact can be an exposed surface of the interior surface of the hook of the coupling portion, or the second contact can be a conductive member disposed on the interior surface of the hook of the coupling portion.

In accordance with a third example, a method of supplying power to an electrical component coupled to a shelf assembly for an enclosure is provided that includes mounting a coupling portion of a side bracket for a shelf assembly to mounting structure of an enclosure to thereby electrically engage a positive terminal member of the mounting structure with a first contact of the side bracket and a negative terminal member of the mounting structure with a second contact of the side bracket, and supplying power to an electrical component coupled to the shelf assembly from a power source of the enclosure through a circuit formed with the first and second contacts of the side bracket and the positive and negative terminals of the mounting structure.

In some examples, supplying power to the electrical component can include illuminating a light source and/or supplying power to the electrical component coupled to the shelf assembly can include supplying power to an electrical component coupled to the side bracket.

In some examples, mounting the coupling portion of the side bracket for the shelf assembly to the mounting structure of the enclosure can include inserting an upper hook and a lower plug of the coupling portion of the side bracket for the shelf assembly to openings of a ladder rack of the mounting structure. In further examples, mounting the coupling portion of the side bracket for the shelf assembly to the mounting structure of the enclosure to thereby electrically engage the positive terminal member of the mounting structure with the first contact of the side bracket and the negative terminal member of the mounting structure with the second contact of the side bracket can include electrically engaging a busbar of the mounting structure with one of the first contact or the second contact and/or electrically engaging a contact of the ladder rack of the mounting structure with the other of the first contact or the second contact.

In accordance with a fourth example, a shelf assembly for an enclosure is provided that includes a shelf panel having an upper surface being capable of supporting articles thereon, a lower surface, and an edge extending between the upper and lower surfaces and including front, rear, and side edges. The shelf assembly further includes a light housing coupled to the shelf panel and a plurality of light sources received within the light housing to project light outwardly therefrom. The light housing includes one or more walls defining an interior and includes front, rear, and side portions disposed adjacent to the front, rear, and side edges of the shelf panel, respectively.

In some examples, the shelf assembly can include one or more of the following aspects: the light housing can have a contiguous configuration; the light housing can have a watertight, sealed configuration; the one or more walls can include an upper wall extending generally parallel to the lower surface of the shelf panel and a side wall extending downwardly from the upper wall giving the light housing a triangular vertical cross-section; the light housing can include a diffuser disposed within a path of illumination of the plurality of light sources; the plurality of light sources can include at least one light oriented downward relative to a horizontal plane of the shelf panel in a range of 5 degrees to 90 degrees; at least one light source of the plurality of light sources in one of the side portions of the light housing can be oriented at a different angle than at least one light source of the plurality of light sources in one of the front or rear portions of the light housing; the plurality of light sources can include an array of spaced light emitting diodes.

In some examples, the shelf assembly can include side brackets coupled to the shelf panel along respective lateral portions thereof, where each of the side brackets have a rear coupling portion configured to mount to structure of the enclosure. Further, if desired, a connection between one or both of the side brackets and the structure of the enclosure can be configured to provide power to illuminate the plurality of light sources and/or the side portions of the light housing can be coupled to interior faces of the side brackets. In yet a further example, the side bracket can include an inwardly extending upper flange configured to extend along the lower surface of the shelf panel and the side portions of the light housing can be further coupled to the upper flanges of the side brackets. In these examples, the side brackets can include one configured to be a negative electrode and another configured to be a positive electrode; or the connection portion of the one of the side brackets can include a negative contact configured to electrically engage a negative terminal of the enclosure and a positive contact configured to electrically engage a positive terminal of the enclosure.

Any of the above examples can be provided in combination with an enclosure where the enclosure includes a body defining a compartment having a rear wall, mounting structures extending upwardly along the rear wall, where each of the mounting structures are configured to have one of the side brackets secured thereto to mount the shelf assembly within the enclosure, a door configured to be pivoted between an open position exposing the compartment and a closed position covering the compartment, and a controller configured to selectively provide power to the one or more light sources through a circuit including at least one of the ladders and the one of the side brackets. In further examples, the combination can include a sensor configured to provide data to the controller indicating whether the door is in the open position or the closed position and the controller can be configured to energize the one or more light sources in response to determining that the door is in the open position; the controller can be configured to de-energize the one or more light sources in response to determining that a predetermined amount of time has passed; and/or the combination can include a sensor configured to provide data to the controller indicative of an individual being in front of the shelf assembly; and wherein the controller is configured to energize the one or more light sources in response to receiving the data.

DETAILED DESCRIPTION

A shelf assembly for an enclosure such as a temperature-controlled enclosure (e.g., a refrigerator) described herein is capable of illuminating products disposed within the enclosure to aid individuals in viewing the products disposed on the shelf assembly or products located adjacent thereto. Advantageously, the shelf assembly includes one or more light sources coupled to one or more side plate brackets of the shelf assembly to provide illumination from a side of the enclosure interior rather than a front or rear thereof as with conventional illuminated shelf assemblies. The side illumination avoids problems associated with front and rear illumination, described above, by utilizing structure present in conventional shelf assemblies and concealing components along a side of the enclosure, having orientations that avoid directly shining light at a user, and avoiding undesirable shadows in illuminated areas.

Figure 1:
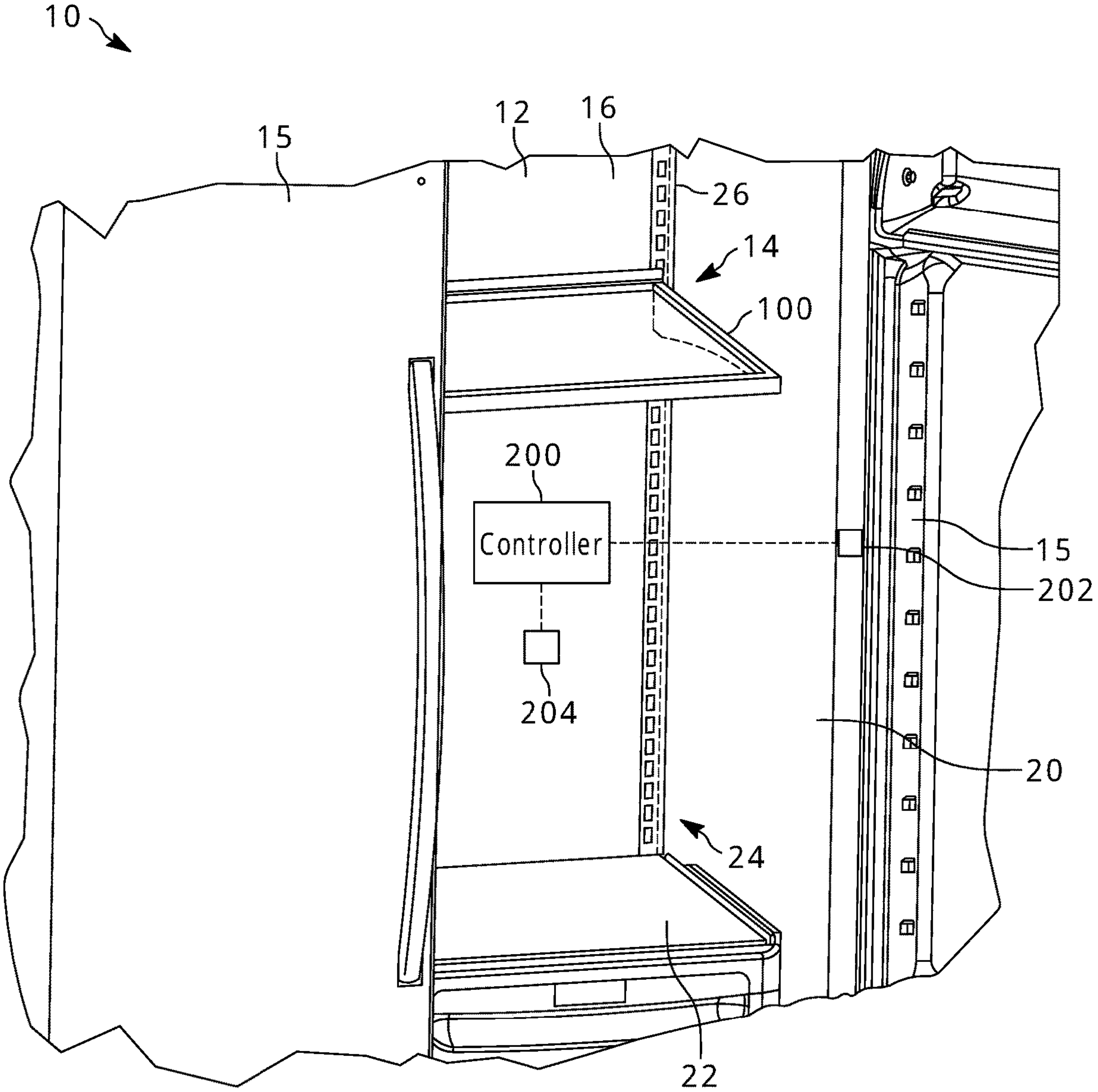
FIG. 1 is a sectional perspective view of an example enclosure suitable for shelving assemblies.
Figure 2:
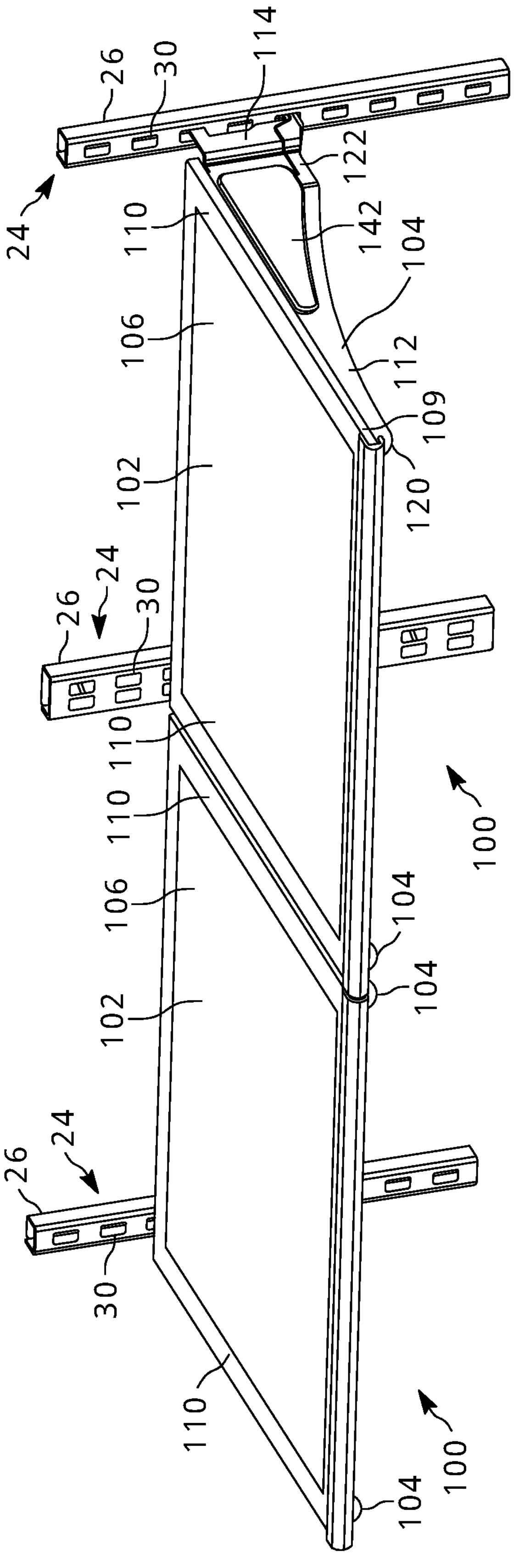
FIG. 2 is a top perspective view of example side-by-side shelf assemblies and mounting structure from an enclosure.
Figure 3:
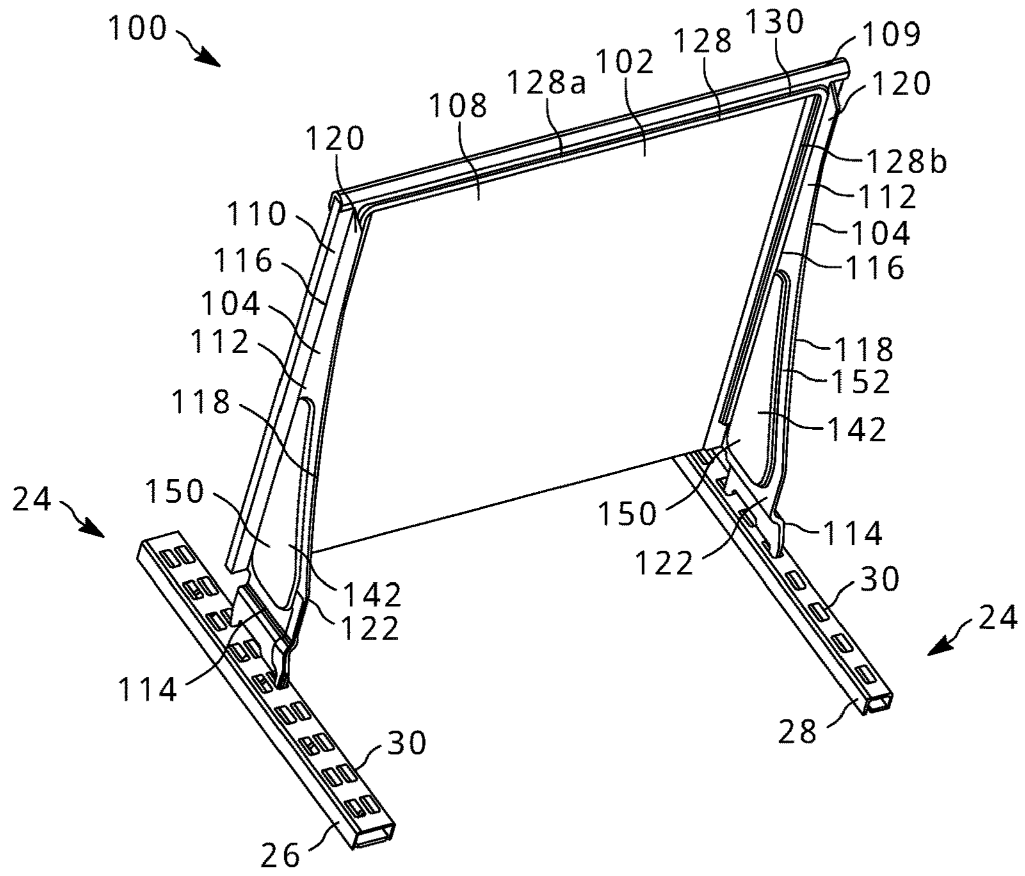
FIG. 3 is a bottom perspective view of one of the shelf assemblies of FIG. 2.

As depicted in FIG. 1, an example enclosure 10 suitable for receiving the shelf assemblies described herein includes a main body 12 defining at least one compartment 14. The enclosure 10 can also include a door 15 pivotable or otherwise movable from a closed position covering an opening of the compartment 14 and an open position providing access to the compartment 14. The compartment 14 is bounded by a rear wall 16, side walls 20, a bottom wall 22, and a top wall (not shown). As shown, the enclosure 10 can include mounting structure 24 extending vertically along the rear wall 16 adjacent to the side walls 20 thereof. In some forms, the enclosure 10 can further include one or more mounting structures 24 extending vertically along the rear wall 16 between the mounting structures 24 disposed adjacent the side walls 20, allowing two shelf assemblies to be mounted within the enclosure 10 in side-by-side relation, as shown in FIG. 2 for example. The shelf assemblies described herein utilize adjacent pairs of mounting structures 24 to be mounted within the compartment 14. For example, the mounting structures 24 can be ladder racks as shown. It will be understood that enclosures, as referred to herein, can include, for example, a residential or commercial refrigerator, a freezer, a wine cooler, a multi-deck commercial refrigerator unit, serve over counter unit, an upright glass door refrigerator, a patisserie display unit, a walk-in enclosure, or any other enclosure, temperature controlled or otherwise.

Example shelf assemblies 100 are shown in FIGS. 2-13 that include a shelf panel 102 and a pair of opposite side brackets 104 coupled to the shelf panel 102 to provide support thereto and to mount the shelf panel 102 to the enclosure 10. The shelf panel 102 includes a generally flat and planar article having an upper surface 106 capable of supporting articles thereon, a lower surface 108 that is opposite the upper surface 106, and an edge 109 that extends between the upper surface 106 and the lower surface 108. The side brackets 104 are coupled to the shelf panel 102 along opposite, lateral outer edge portions 110 thereof. Although the side brackets 104 are shown depending downwardly from the lower surface 108 of the shelf panel 102, in another approach, the side brackets 104 can extend upwardly from the upper surface 106 of the shelf panel 102. Moreover, in an alternative example, the side brackets 104 could be coupled to the outer edge 109 of the shelf panel 102. The shelf panel 102 of the depicted version may be a uniform surface, as illustrated in the figures, made of glass, metal, plastic, or any other polymer. In other examples, however, the shelf panel 102 can be a welded wire form mat. The side brackets 104 can be coupled to the shelf panel with adhesive, fasteners, or some other mechanical or non-mechanical device.

As illustrated in FIGS. 2-8, the side brackets 104 releasably couple the shelf panel 102 to the mounting structure 24 the enclosure 10, such as, for example, a ladder rack type assembly (shown partly in FIG. 1), in a cantilevered fashion, as conventionally known in the appliance industry.

As illustrated in FIGS. 2-13, each side bracket 104 includes a front main body portion 112 and a rear coupling portion 114 for mounting the side bracket 104 with the mounting structure 24 of the enclosure. The main body portion 112 includes an upper edge 116 that extends along the lower surface 108 of the shelf panel 102 and an opposite lower edge 118. In some examples, the main body 112 can have a generally vertical and planar, triangular configuration, as shown, with the lower edge 118 optionally having a concavely curved configuration. Other geometries are within the scope of this disclosure. A front end 120 of the main body portion 112 is disposed adjacent to the outer edge 109 of the shelf panel 102 extending along the front thereof, while a rear end 122 of the main body portion 112 is disposed adjacent to the outer edge 109 of the shelf panel 102 extending along the rear thereof. In the illustrated example, the front end 120 is recessed with respect to the front outer edge 109 and the rear end 122 extends beyond the rear outer edge 109.

The side brackets 104 may be a stamped metal. In other examples, the side brackets 104 can be formed of wire or any other conductive, or non-conductive material. The coupling portion 114 can include an upper hook 124 for being inserted into and engaging the mounting structure 24 of the enclosure 10 and a lower, plug 126 for extending into the mounting structure 24. In other examples, however, the side brackets 104 can be secured to the mounting structure 24 using a mechanical fastener, an adhesive, a tape bond, an ultrasonic weld, a snap fit, or any other known attachment mechanisms.

As shown in FIGS. 1-7, the mounting structure 24 can advantageously be utilized to provide electrical power to the side brackets 104 and lighting components coupled thereto. In one example, one of the mounting structures 24 for the shelf assembly 100 can be a positive terminal, e.g., +12 vdc, and the other of the mounting structures 24 for the shelf assembly 100 can be a negative terminal, e.g., −12 vdc. Of course any suitable power settings can be utilized. The side brackets 104 of this form are configured to electrically engage the mounting structures 24 and the shelf assembly 100 includes an electrical crossover 128 (shown in FIGS. 3, 7, and 8, for example) extending between the side brackets 104 to provide an electrical connection therebetween, such that when the shelf assembly 100 is coupled to the mounting structure 24, a circuit is formed with a power source of the enclosure 10 providing power to light components coupled to one or both of the side brackets 104. As shown, the crossover 128 can include a shelf panel portion 128*a* (shown in FIG. 3) extending across the shelf panel 102 and side bracket portions 128*b* extending along the side brackets 104 to allow the shelf panel portion 128 to be disposed at a desired location on the shelf panel 102. The crossover 128 can be coupled to the shelf panel 102 at any desired location. For example, the crossover 128 can run along the front edge, the rear edge, or intermediate thereof. Further, if desired, the crossover 128 can include a trim strip 130 (shown in FIG. 3) that couples to the shelf assembly 100 to cover and protect the crossover 128.

Figure 4:
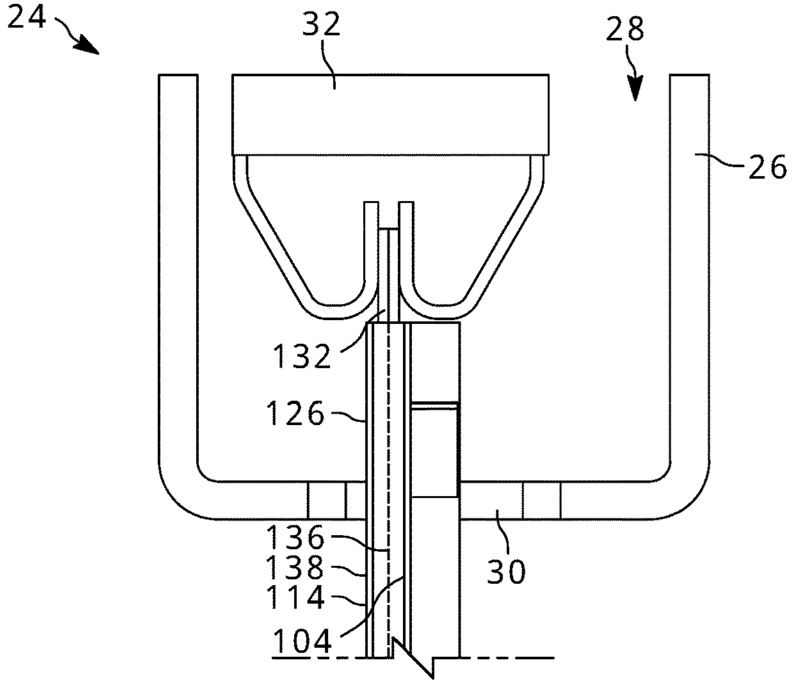
FIG. 4 is a cross-sectional view of a first example electrical connection between mounting structure of an enclosure and a side bracket of a shelf assembly.

As shown in FIG. 4, the ladder rack type assembly of the illustrated mounting structure 24 can include an elongate ladder housing 26 having an interior 28 with a wall of the housing 26 defining vertically spaced openings 30 formed therein to receive the hook 124 and the plug 126 of the side bracket 104 and thereby couple the side bracket 104 with the housing 26. In some examples, the housing 26 itself, e.g., an exposed surface or edge, can provide the terminal for the lighting circuit and/or include a contact having any suitable configuration, such as a trace, wire, probe, spring, spring-loaded, socket, conductive adhesive, conductive pad, etc., extending therealong to be positioned on an edge of or adjacent to the openings 30 to thereby engage the hook 124 or plug 126. It will be understood that in examples utilizing an exposed surface or edge for a contact, as described herein, the component can include a non-conductive coating extending around the contact or over an entirety of an exterior surface thereof not intended to be a contact. In another example, the mounting structure 24 can further include an elongate busbar 32 disposed within the housing interior 28 and aligned behind the openings 30 so that a portion of the hook 124 or plug 126 electrically engages the busbar 32. The busbar 32 can take any suitable form, such as a dual leaf spring as shown. In this example, the side bracket 104 can include a conductive member 132 configured to be inserted into or otherwise engage the dual leaf spring contact of the busbar 32 when the side bracket 104 is coupled to the housing 26. The conductive member 132 can take any suitable form, including a trace, wire, probe, spring, socket, conductive adhesive, conductive pad, and so forth.

Figure 5:
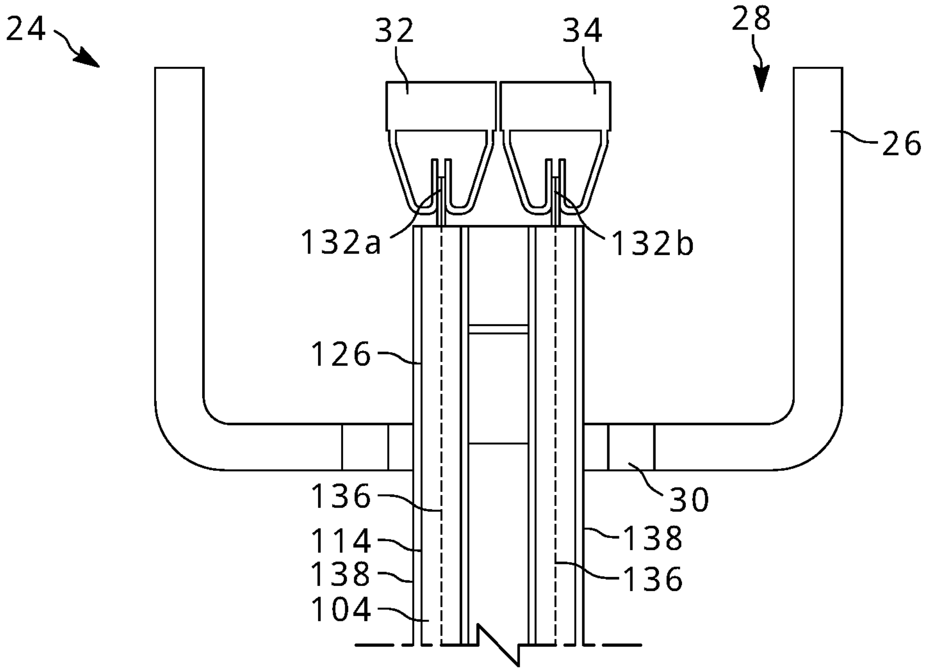
FIG. 5 is a cross-sectional view of a second example electrical connection between mounting structure of an enclosure and a side bracket of a shelf assembly.
Figure 6:
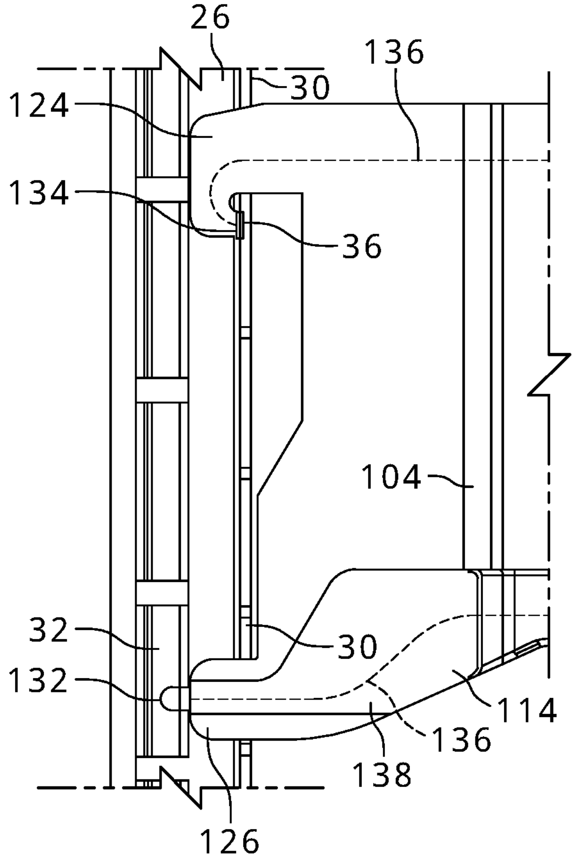
FIG. 6 is a cross-sectional view of a third example electrical connection between mounting structure of an enclosure and a side bracket of a shelf assembly.
Figure 7:
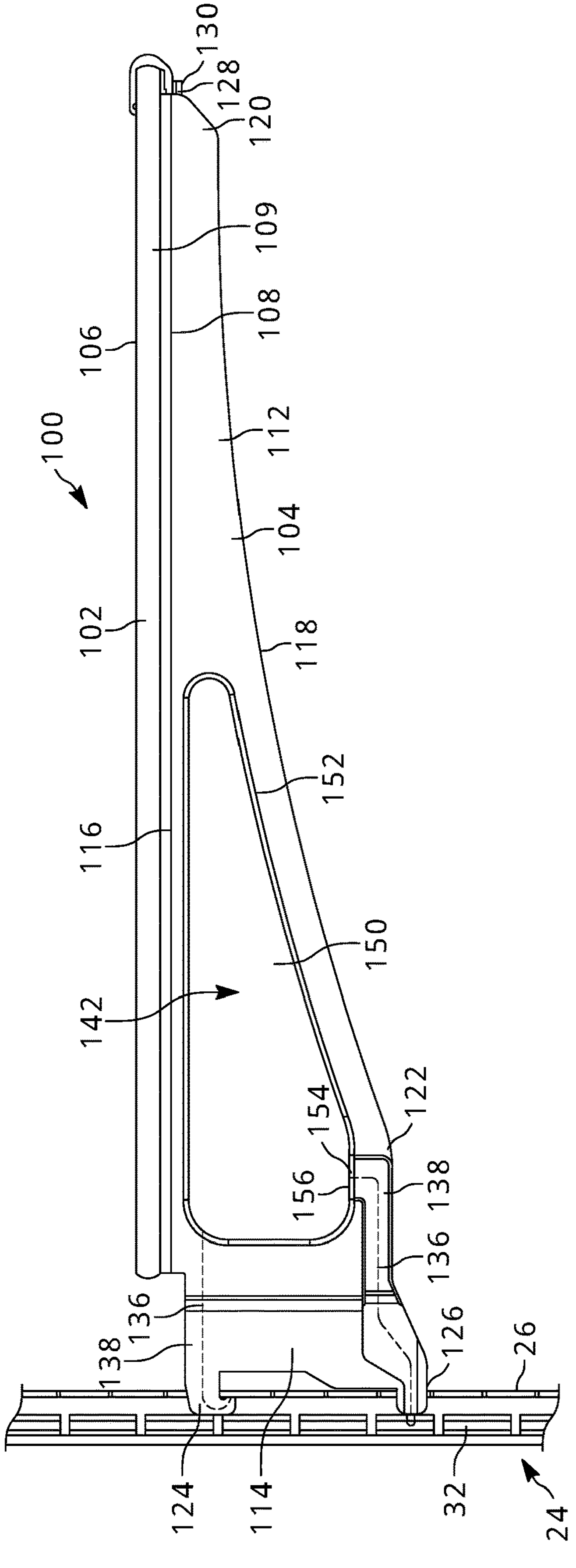
FIG. 7 is a side elevational view of a shelf assembly coupled to mounting structure of an enclosure showing a first example light housing disposed within an opening defined therein.
Figure 8:
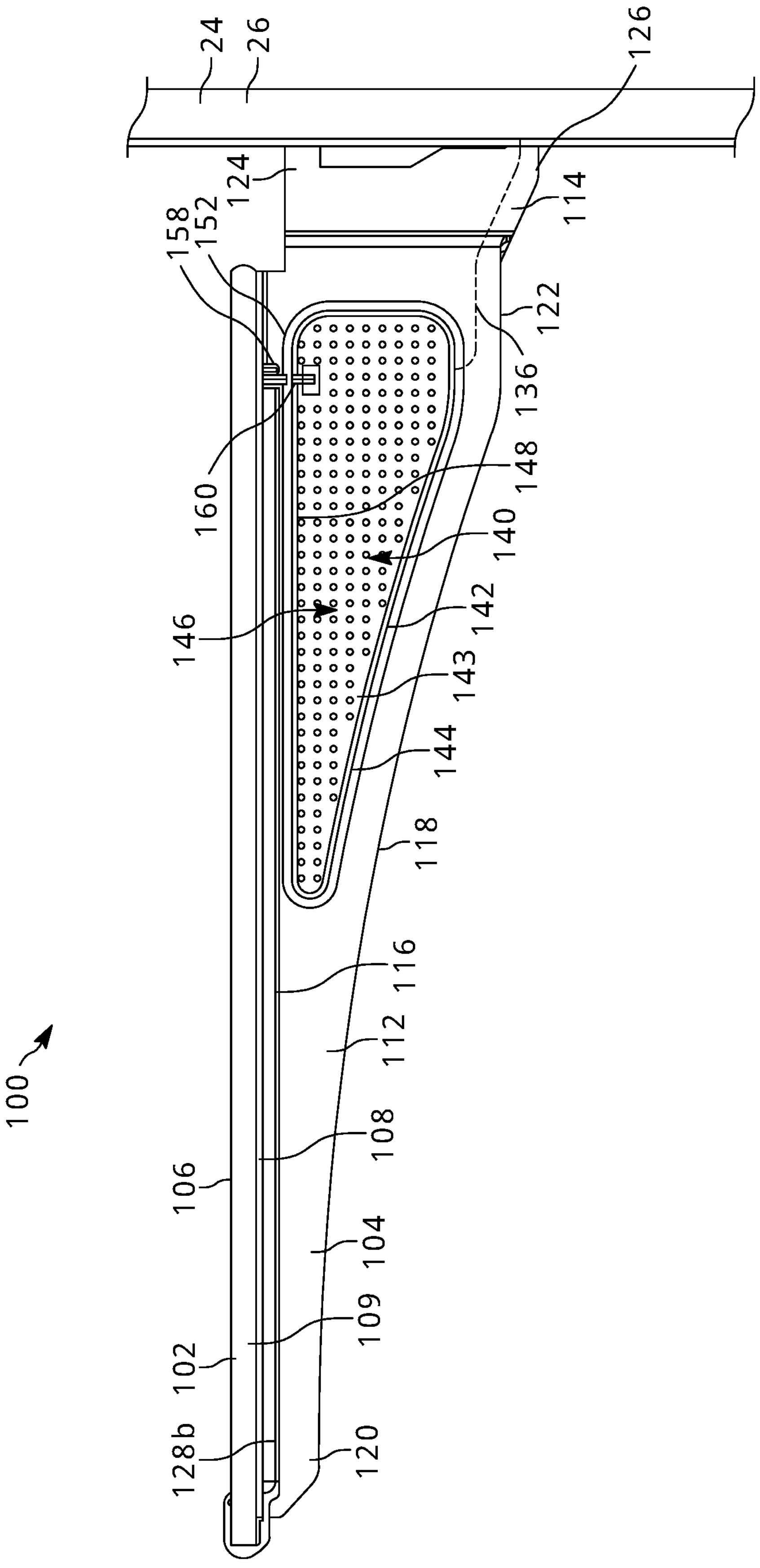
FIG. 8 is a cross-sectional view of the shelf assembly of FIG. 7 showing an interior of the light housing thereof.

In another example as shown in FIGS. 4-6, one of the mounting structures 24 can provide both a positive terminal and a negative terminal to a side bracket 104 coupled thereto. This configuration allows lighting coupled to the side bracket 104 to be powered from a single bracket connection to the enclosure 10 rather than requiring the crossover 128 extending between the side brackets 104. The mounting structure 24 of this form can be configured to electrically engage different and electrically separated portions, i.e., a positive contact and a negative contact, of the side bracket 104 to create a circuit with a power source of the enclosure 10 to power electrical components coupled to the side bracket 104 or other parts of the shelf assembly 100, such as the shelf panel 102. The electrical components can be light sources and associated circuitry as described herein or other electrical components, such as sensors, as desired. In this example, the busbar 32 provides one of the terminals for the light circuit and a separate busbar 34 or the housing 26 itself provides the other terminal for the light circuit.

For an example configuration with two busbars 32, 34 as shown in FIG. 5, the side bracket 104 can include separate, spaced conductive members 132*a*, 132*b*, configured to electrically engage one of the busbars 32, 34 when the side bracket 104 is coupled to the housing 26. The conductive members 132*a*, 132*b* can be provided on any desired part of the coupling portion 114, including both on the plug 126, both on the hook 124, one on the plug and the other on the hook 124 or on the coupling portion 114 intermediate of the hook 124 and plug 126.

For an example configuration with the housing 26 providing one of the terminals as shown in FIG. 6, the housing 26 can include a contact 36 and the side bracket 104 can include a corresponding contact 134 that electrically engages the housing contact 36 when the side bracket 104 is coupled to the mounting structure 24. As discussed above, contact, as utilized herein, can refer to an exposed conductive surface or edge of the housing 26/side bracket 104 or a conductive member, e.g., a trace, wire, probe, spring, spring-loaded, socket, conductive adhesive, conductive pad, etc., disposed on the housing 26/side bracket 104. As shown in FIG. 6, in one approach, the side bracket contact 134 can be provided on an interior surface of the hook 124, such that when the hook 124 is coupled to the mounting structure 24, the cantilever configuration of the shelf assembly 100 causes the contact 134 to be held against the housing contact 36, which can be provided on an interior edge of the opening 30.

As shown, in either configuration discussed above, the conductive member 132*a* and the second conductive member 132*b* or contact 134 have separate electrical paths 136 to the light components. The electrical paths 136 can take any suitable form, including, e.g., traces, wires, conductive material of the side bracket 104, conductive adhesive, conductive pads, and so forth. Further, if desired, the side bracket 104 can include a housing or protective cover 138 extending over the electrical paths 136.

As shown in FIGS. 7-10, the side brackets 104 can include one or more light sources 140, e.g., light emitting diodes, surface mount or otherwise, coupled and electrically connected thereto. For example, the light sources 140 can be electrically connected to the electrical paths 136, such that the light sources 140 are powered via connections of the side bracket(s) 104 with the enclosure 10, as discussed above.

In some examples, the side bracket 104 can include a light housing 142 coupled thereto to house the light sources 140 and associated electrical components, such as a circuit board 143 and the like. The light housing 142 can include one or more walls 144 defining an interior 146 sized to receive the light sources 140 and defining an open front 148 through which light emitted by the light sources 140 is projected. If desired, the light housing 142 further include a cover 150 extending across the open front 148 and the path of illumination of the light sources 140 to protect lighting components therein. The cover 150 can have light altering characteristics. For example, the cover 150 can be a diffuser, lens, can be translucent, can be tinted a desired color to thereby color light emitted from the light sources 140, and so forth. The light housing 142 can have a sealed, watertight configuration. This allows the shelf assembly 100 to be washable without exposing the electronics within the housing 142 to water or other cleaning agents. For example, the cover 150 can be have a sealed engagement with the walls 144 and the walls 144 of the light housing 142 can be integral with the side bracket 104 or the light housing 142 can be a separate component configured to be mounted or otherwise secured to the side bracket 104, as discussed in more detail below.

The light housing 142 can be coupled to the side bracket 104 at any desired location and/or span. In a first example shown in FIGS. 7 and 8, the side bracket 104 can define an opening 152 extending through the front main body portion 112 thereof. As shown, a perimeter of the opening 152 and the light housing 142 can have a complementary shape, so that the light housing 142 can be fit within the opening 152 to mount the light housing 142 to the side bracket 104. The light housing 142 can mount within the opening 152 by any desired mechanism, including, e.g., snap-fit, tongue-and-groove, fasteners, ultrasonic welding, adhesive, and so forth. Although a generally triangular opening 152 and light housing 142 is shown, the shape and size of the opening and light housing 142 can take any desired form.

By one approach, mounting the light housing 142 within the opening 152 can electrically couple the light housing 142, and the components therein, to electronic connections in the side bracket 104. For example, the side bracket 104 can include a contact 154 exposed on and adjacent to an edge of the opening 152 and the light housing 142 can include a corresponding contact 156 exposed along an exterior thereof, such that the contacts are aligned and engaged one another when the light housing 142 is mounted in the opening 152. Similarly, in configurations utilizing the crossover 128, mounting the light housing 142 within the opening 152 can electrically couple the light housing 142, and the components therein, to the side bracket portion **128*b* of the crossover 128. For example, the side bracket 104 can include a contact 158 exposed on and adjacent to an edge of the opening 152 and the light housing 142 can include a corresponding contact 160 exposed along an exterior thereof, such that the contacts are aligned and engaged one another when the light housing 142 is mounted in the opening 152. As discussed above, the contacts 154, 156, 158, 160** can take any desired form, including, e.g., an exposed conductive surface or edge, or a conductive member, such as a trace, wire, probe, spring, spring-loaded, socket, conductive adhesive, conductive pad, etc.

Figure 9:
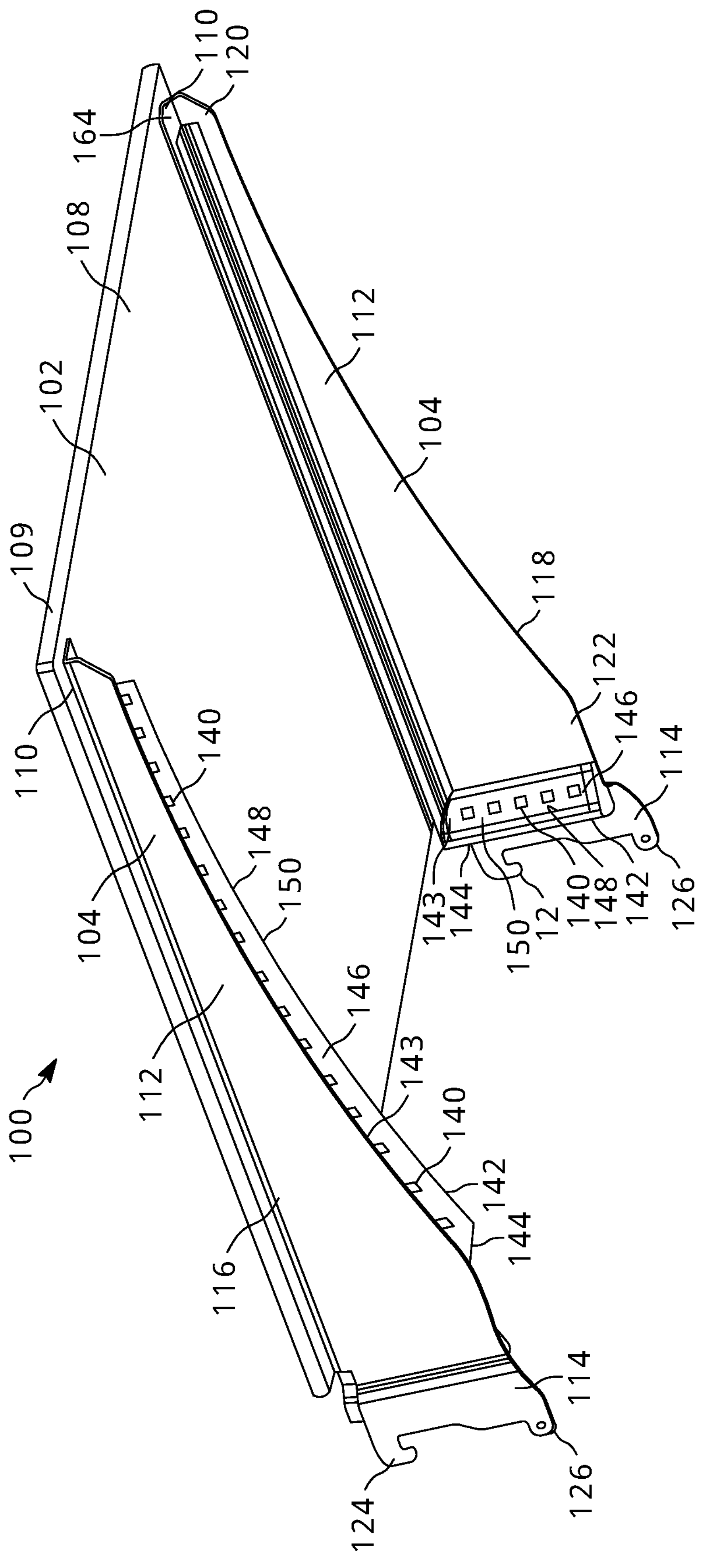
FIG. 9 is a bottom perspective view of a shelf assembly showing second and third example light housings coupled to side brackets thereof.
Figure 10:
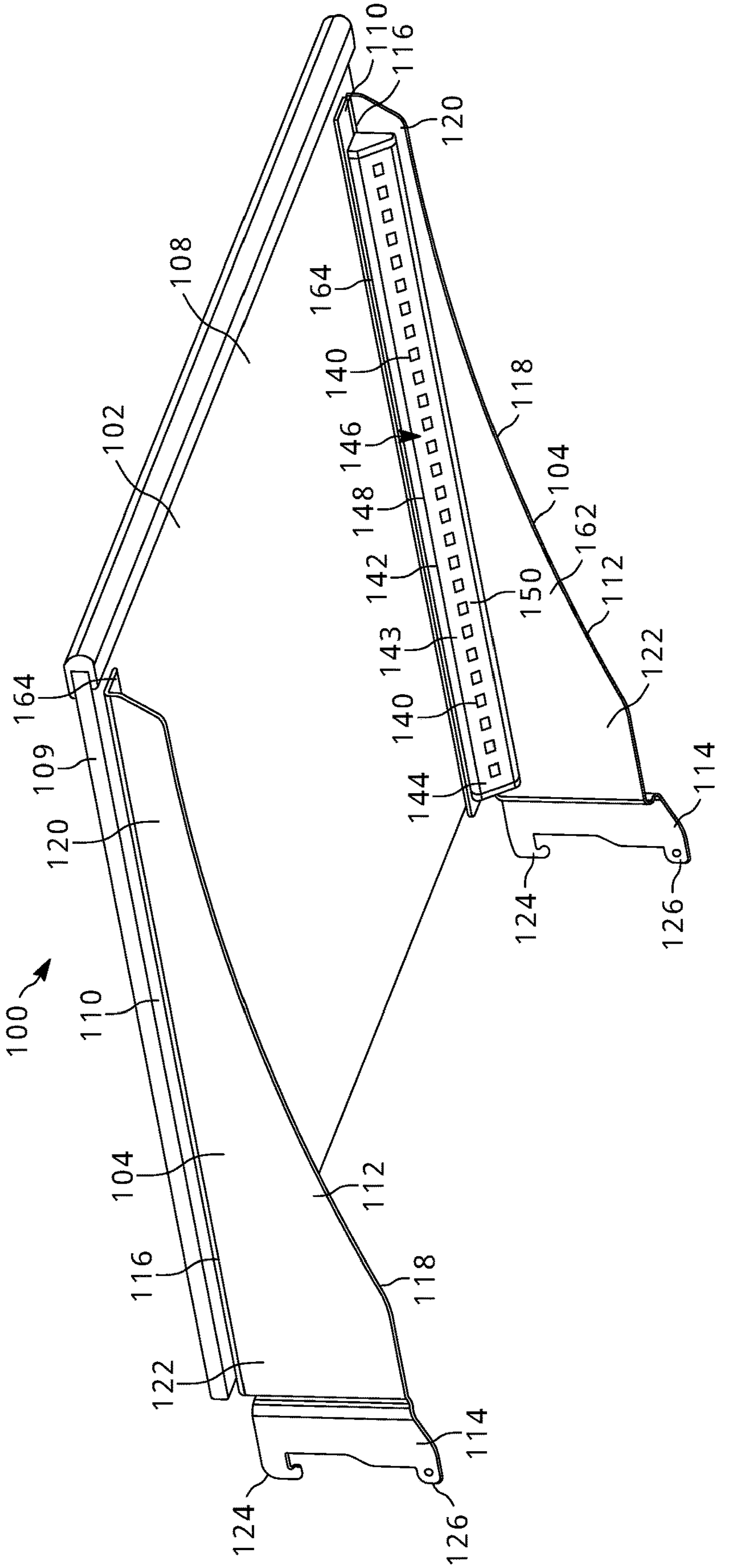
FIG. 10 is a bottom perspective view of a shelf assembly showing a fourth example light housing coupled to a side bracket thereof.

In other examples, shown in FIGS. 9 and 10, the light housing 142 can be coupled to a surface or surfaces of the side bracket 104. In one example, the light housing 142 can be coupled to and extend along some or all of the lower edge 118 of the main body portion 112 of the side bracket 104 as shown in FIG. 9. In another example, the light housing 142 can be coupled to the rear coupling portion 114 and/or to the rear end 122 of the main body portion 112 of the side bracket 104 to extend generally forwardly and inwardly therefrom as shown in FIG. 10. In this example, the light housing 142 can have a vertical orientation extending the height of the side bracket 104. In another example, the light housing 142 can be coupled to and extend along an interior face 162 of the main body portion 112 of the side bracket 104 as shown in FIG. 10. Further, if desired, the side bracket 104 can include an inwardly extending upper flange 164 that extends along the lower surface 108 of the shelf panel 102 and the light housing 142 of this example can be disposed in the corner between the main body 112 and the upper flange 164 as shown.

The light sources 140 of any of the above forms can advantageously be oriented to provide light to desired locations within the enclosure compartment 14. For example, the light sources 140 can include at least one light source oriented downward relative to a horizontal plane of the shelf panel 102 in a range of 5 degrees to 90 degrees, a range of 5 degrees to 75 degrees, a range of 5 degrees to 60 degrees, a range of 5 degrees to 45 degrees, a range of 5 degrees to 30 degrees, or a range of 5 degrees to 20 degrees. In other example, the light sources 140 can include at least one light source oriented parallel to the horizontal plane of the shelf panel 102. It will be understood that the light sources 140 can be arranged in an array with all the light sources having the same orientation, or an array with light sources having two or more differing orientations.

Figure 11:
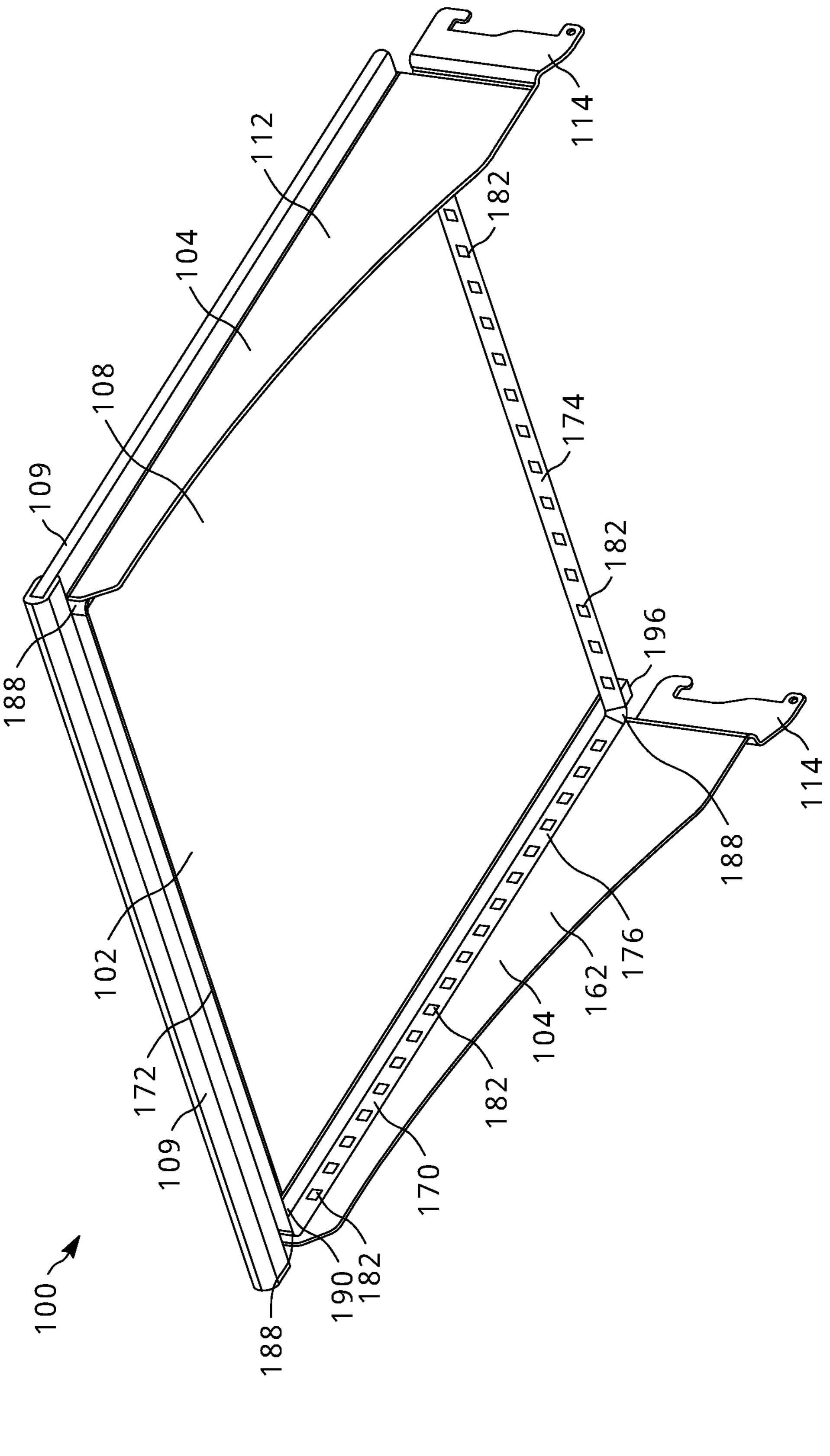
FIG. 11 is a bottom perspective view of a shelf assembly showing a fifth example light housing coupled thereto.
Figure 12:
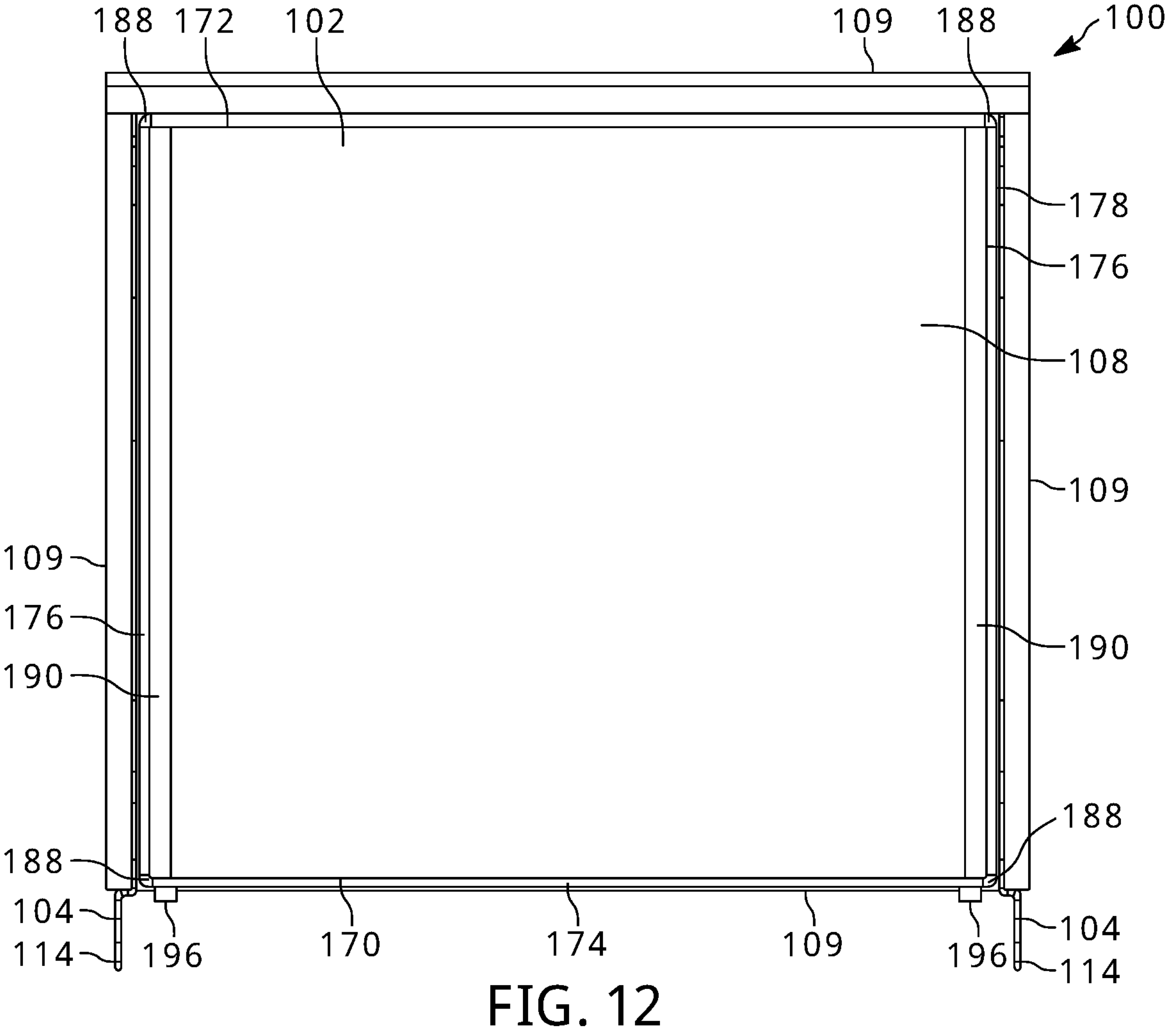
FIG. 12 is a bottom plan view of the shelf assembly of FIG. 11.
Figure 13:
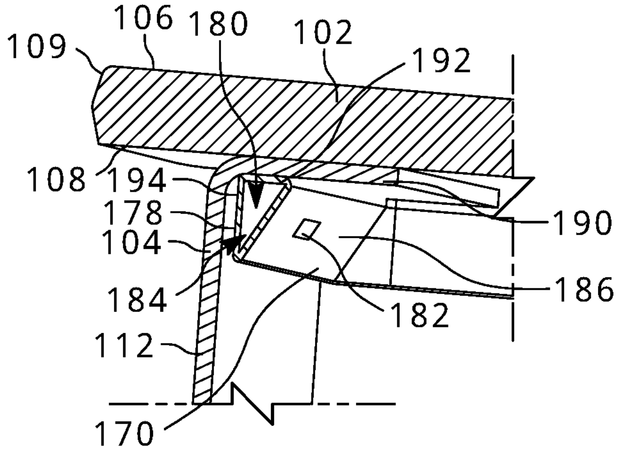
FIG. 13 is a cross-sectional view of the shelf assembly of FIG. 11 showing detail of the light housing thereof.

In another example shown in FIGS. 11-13, the shelf assembly 100 can include a light housing 170 coupled to the shelf panel 102 to extend around a perimeter thereof and provide lighting adjacent to the edges 109 thereof. As shown, the light housing 170 includes front, rear, and side portions 172, 174, 176 (FIG. 12) extending along and adjacent to the front, rear, and side edges 109 of the shelf panel 102, respectively. The light housing 170 includes one or more walls 178 forming an interior 180 (FIG. 13) sized to receive light sources 182, e.g., light emitting diodes, surface mount or otherwise, therein. The light sources 182 are oriented to project light out from the light housing 170 through an open front 184 thereof generally away from each of the edges 109 of the shelf panel to illuminate desired areas within the compartment 14. This configuration will advantageously reduce or eliminate undesirable shadows within the compartment 14.

If desired, the light housing 170 further include a cover 186 extending across the open front 184 and the path of illumination of the light sources 182 to protect lighting components therein. The cover 186 can have light altering characteristics. For example, the cover 186 can be a diffuser, lens, can be translucent, can be tinted a desired color to thereby color light emitted from the light sources 182, and so forth. The light housing 170 can have a sealed, watertight configuration. This allows the shelf assembly 100 to be washable without exposing the electronics within the housing 170 to water or other cleaning agents. For example, the cover 186 can be have a sealed engagement with the walls 178 and the walls 178 can have an integral or sealed engagement with the shelf panel 102 and/or side brackets 104.

In some examples as shown in FIG. 12, the light housing 170 can have a contiguous configuration with unbroken walls 178 extending around the shelf assembly 100. As shown, the front, rear, and side portions 172, 174, 176 of the light housing 170 are connected directly together by corners 188 giving the light housing 170 a unitary construction. It will be understood that the portions 172, 174, 176 can be integral with one another or can be secured together by any suitable method. Further, the portions 172, 174, 176 of the light housing 170 can be coupled to the shelf panel 102 and/or side brackets 104, e.g., the interior face 162 (FIG. 11) thereof, by any suitable method. For example, the light housing 170 can be secured using fasteners, snap-fittings, or the like, can be bonded to or include portions integral with the shelf panel 102 and/or side brackets 104, and so forth.

In the illustrated example, the side brackets 104 can each include an inwardly extending upper flange 190 that extends along the lower surface 108 of the shelf panel 102 and the side portions 176 of the light housing 170 of this example can be disposed in the corner between the main body 112 of the side bracket 104 and the upper flange 188.

As shown in FIG. 13, the walls 178 of the light housing 170 can include an upper wall 192 and a side wall 194 extending downwardly from the upper wall 190. For example, the walls 190, 192 can be generally, e.g., within 5 degrees, perpendicular with respect to one another giving the light housing 170 a triangular vertical cross-section. Further, the upper wall 190 can extend generally parallel with the lower surface 108 of the shelf panel 102.

The light sources 182 of the light housing 170 can receive power from the enclosure 10 by any of the methods described herein. For example, the light housing 170 can form a circuit with the enclosure 10 via one or both of the side brackets 104 via the coupling portions 114 thereof. In another example, the light housing 170 can include an electrical connection 196 exposed along the rear portion 174 thereof. The connection 196 can be a plug configured to be inserted into a socket formed in the compartment 14, a port configured receive a plug from the enclosure 10, an induction coil configured to wirelessly receive power from the enclosure, or a wired connection. It will be further understood that any of the above example light housings could have a similar electrical connection.

The light sources 182 of any of the above forms can advantageously be oriented to provide light to desired locations within the enclosure compartment 14. For example, the light sources 182 can include at least one light source oriented downward relative to a horizontal plane of the shelf panel 102 in a range of 5 degrees to 90 degrees, a range of 5 degrees to 75 degrees, a range of 5 degrees to 60 degrees, a range of 5 degrees to 45 degrees, a range of 5 degrees to 30 degrees, or a range of 5 degrees to 20 degrees. In other example, the light sources 182 can include at least one light source oriented parallel to the horizontal plane of the shelf panel 102. It will be understood that the light sources 182 can be arranged in an array with all the light sources having the same orientation, or an array with light sources having two or more differing orientations. For example, at least one light source of the plurality of light sources 182 in one of the side portions 176 of the light housing 170 can be oriented at a different angle than at least one light source of the plurality of light sources 182 in one of the front or rear portions 172, 174 of the light housing 170. In this example, one or more of the light sources 182 in the front and/or rear portions 172, 174 can be oriented more downwardly relative to horizontal than one or more of the light sources 182 in the side portions 176.

As shown in FIG. 1, the enclosure 10 and/or shelf assembly 100 can further include a controller 200 communicatively coupled to the light sources 140, 182 and a power source 40 of the enclosure 10. So configured, the controller 200 may be configured to selectively supply power to each of the light sources 140, 182 via the mounting structure(s) 24 from the light circuit, as discussed above. The controller 200 may have logic instructing the controller 200 to energize and de-energize the light sources 140, 182 or combinations thereof. The controller 200 may execute the logic in response to a signal received from an external sensor. Additionally, the controller 200 may execute the logic at predetermined times throughout the day. Further, the controller 200 may be disposed within the enclosure 10 or the light housing 142, 170. In other examples, the controller 200 can be remote from the enclosure 10 or the light housing 142, 170 and coupled thereto wirelessly or through a wired connection.

The controller 200 can be configured to energize the light sources 140, 182 according to any desired scenario. In one example, the controller 200 may be configured to supply power to the light sources 140, 182 based on the operating hours of a location in which the enclosure 10 with the shelf assembly 100 is disposed. In another example, the enclosure 10 or shelf assembly 100 can include a sensor 202 configured to provide data to the controller 200 indicating whether the door 15 is in the open position or the closed position. With this configuration, the controller 200 can be configured to supply power to the light sources 140, 182 in response to determining that the door 15 is in the open position. Further, the controller 200 can be configured to stop the supply of power to the light sources 140, 182 in response to determining that a predetermined amount of time has passed after the light sources 140, 182 were energized. Alternatively, the controller 200 can be configured to maintain the flow of power to the light sources 140, 182 until the sensor 202 provides data to the controller 200 indicating that the door 15 is in the closed position. In another example, the enclosure 10 or shelf assembly 100 can include a proximity sensor 204 configured to provide data to the controller 200 indicative of an individual being in front of the shelf assembly 100 or enclosure 10. With this configuration, the controller 200 can be configured to supply power to the light sources 140, 182 in response to receiving the data from the proximity sensor 204 that is indicative of an individual. Further, the controller 200 can be configured to stop the supply of power to the light sources 140, 182 in response to determining that a predetermined amount of time has passed after the light sources 140, 182 were energized. Alternatively, the controller 200 can be configured to maintain the supply of power to the light sources 140, 182 until the proximity sensor 204 provides data to the controller 200 indicating that the individual is no longer in front of the shelf assembly 100 or enclosure 10.

The foregoing description is provided as an example of embodying the present disclosure but is not intended to be limiting of the disclosure or of any invention based thereon. Rather, the scope of any invention based on the disclosure can be defined by the following claims and also includes all equivalents thereof that fall within the spirit and scope of the claims and the disclosure as a whole.

What is claimed:

1. A shelf assembly for an enclosure, the shelf assembly comprising:

a shelf panel having an upper surface, a lower surface, and an edge extending between the upper and lower surfaces, the upper surface being capable of supporting articles thereon;

side brackets coupled to the shelf panel along respective lateral portions thereof, each of the side brackets having a rear coupling portion configured to mount to structure of the enclosure, wherein one of the side brackets defines an opening therein with a contact adjacent thereto; and a light housing coupled and electrically connected to the one of the side brackets, the light housing having one or more light sources received therein to be mounted and electrically coupled to the one of the side brackets, the light housing having a contact exposed along an exterior thereof, the contact of the light housing configured to electrically engage the contact of the one of the side brackets when the light housing is mounted within the opening;

wherein a connection between the one of the side brackets and the structure of the enclosure or both of the side brackets and the structure of the enclosure is configured to provide power to illuminate the one or more light sources.

2. The shelf assembly of claim 1, wherein the light housing has a watertight, sealed configuration.

3. The shelf assembly of claim 1, wherein the light housing further comprises a diffuser disposed within a path of illumination of the one or more light sources.

4. The shelf assembly of claim 1, wherein the light housing is configured to snap-fit within the opening defined in the one of the side brackets.

5. The shelf assembly of claim 1, wherein the contact of the one of the side brackets comprises one of: an exposed edge, a bare face portion, a conductive adhesive, a conductive pad, or a trace.

6. The shelf assembly of claim 1, wherein the one or more light sources include at least one light oriented downward relative to a horizontal plane of the shelf panel in a range of 5 degrees to 90 degrees.

7. The shelf assembly of claim 1, wherein the one or more light sources include at least one light oriented generally parallel to a horizontal plane of the shelf panel.

8. The shelf assembly of claim 1, wherein the side brackets include one configured to be a negative electrode and another configured to be a positive electrode; and further comprising an electrical cross-over extending between the side brackets across the shelf panel to create a circuit with the enclosure to power the one or more light sources.

9. The shelf assembly of claim 8, further comprising a trim strip covering the electrical cross-over.

10. The shelf assembly of claim 1, wherein the rear coupling portion of the one of the side brackets includes a negative contact configured to electrically engage a negative terminal of the enclosure and a positive contact configured to electrically engage a positive terminal of the enclosure.

11. The shelf assembly of claim 1, wherein the one or more light sources comprise an array of spaced light emitting diodes.

12. The shelf assembly of claim 1 in combination with the enclosure, the enclosure comprising:

a body defining a compartment having a rear wall;

mounting structures extending upwardly along the rear wall, each of the mounting structures configured to have one of the side brackets secured thereto to mount the shelf assembly within the enclosure;

a door configured to be pivoted between an open position exposing the compartment and a closed position covering the compartment;

a controller configured to selectively provide power to the one or more light sources through a circuit including at least one of the mounting structures and the one of the side brackets.

13. The combination of claim 12, further comprising a sensor configured to provide data to the controller indicating whether the door is in the open position or the closed position; and wherein the controller is configured to energize the one or more light sources in response to determining that the door is in the open position.

14. The combination of claim 13, wherein the controller is configured to de-energize the one or more light sources in response to determining that a predetermined amount of time has passed.

15. The combination of claim 12, further comprising a sensor configured to provide data to the controller indicative of an individual being in front of the shelf assembly; and wherein the controller is configured to energize the one or more light sources in response to receiving the data.

* * * * *